United States Patent [19]

Abe et al.

[11] Patent Number: 5,350,556
[45] Date of Patent: Sep. 27, 1994

[54] METHOD FOR MANUFACTURING FIBER REINFORCED THERMOPLASTIC RESIN MOLDED ARTICLE

[75] Inventors: Eizi Abe; Toshiharu Fukushima, both of Hamamatsu, Japan

[73] Assignee: Yamaha Corporation, Japan

[21] Appl. No.: 2,269

[22] Filed: Jan. 8, 1993

[30] Foreign Application Priority Data

Jan. 10, 1992 [JP] Japan .................................. 4-3389

[51] Int. Cl.⁵ ...................... B29C 65/02; B29C 67/14
[52] U.S. Cl. .................................. 264/248; 156/304.2; 156/304.3; 264/258; 264/314; 273/167 H
[58] Field of Search ............... 264/248, 249, 257, 258, 264/266, 314; 156/304.2, 304.3, 304.6, 308.4, 309.6; 273/167 H

[56] References Cited

U.S. PATENT DOCUMENTS

| | | | |
|---|---|---|---|
| 2,460,820 | 2/1949 | Hogopian | 264/314 |
| 4,021,047 | 5/1977 | Mader | 273/167 H |
| 4,575,447 | 3/1986 | Hariguchi | 273/167 H |
| 4,902,458 | 2/1990 | Trimble | 264/258 |
| 5,013,514 | 5/1991 | Azzani et al. | 264/314 |
| 5,173,142 | 12/1992 | Billin | 156/304.2 |
| 5,175,032 | 12/1992 | Steele et al. | 156/308.4 |

FOREIGN PATENT DOCUMENTS

2040790 9/1980 United Kingdom ................ 264/314

Primary Examiner—Jay H. Woo
Assistant Examiner—Robert B. Davis
Attorney, Agent, or Firm—Ostrolenk, Faber, Gerb & Soffen

[57] ABSTRACT

Using a fiber reinforced thermoplastic resin, component materials of shapes obtained by partitioning the shape of the desired hollow article into a plurality of parts are molded. Reinforcing members 5, made of a prepreg wherein reinforcing fiber is impregnated with thermoplastic resin, are affixed to the junctions of these component materials 1. These are housed within mold 7 as a hollow provisional assembly and a joined unitary body is formed by adding pressure and heating. Using the method of the present invention, it is possible to efficiently manufacture a complicatedly shaped hollow article, the obtained molded article being one which excels in mechanical strength and, moreover, has a surface which is continuous and smooth.

8 Claims, 6 Drawing Sheets

METHOD FOR MANUFACTURING FIBER REINFORCED THERMOPLASTIC RESIN MOLDED ARTICLE

BACKGROUND OF THE INVENTION

1. Field of the Invention

The present invention relates to a method for manufacturing a hollow fiber reinforced thermoplastic resin molded article. In the case where joining a plurality of component materials consisting of fiber reinforced thermoplastic resin, with the method of the present invention, by affixing reinforcing pieces consisting of a fiber reinforced thermoplastic prepreg to the junctions along which the component materials are joined, housing of this within a mold as a provisional assembly and then forming a joined unitary body by increasing the internal pressure within the mold while heating, it is possible to efficiently manufacture a complicatedly shaped hollow article excelling in mechanical strength.

2. Related Art

Figure 6:
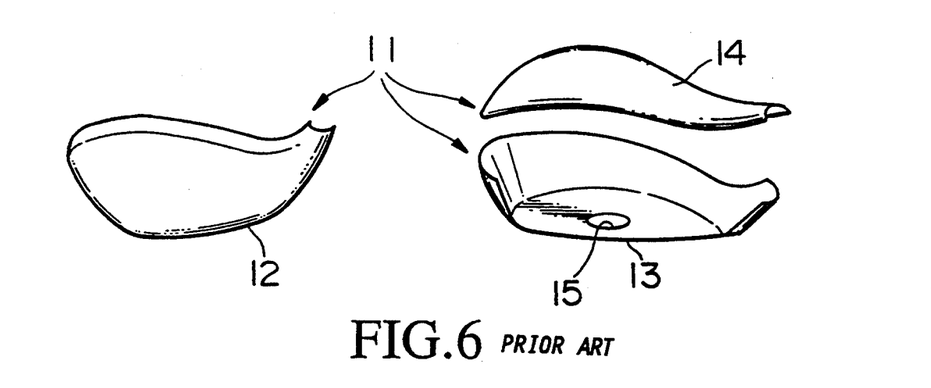
FIG. 6 is a perspective view showing an example of the shapes of the component materials of a conventional manufacturing method.
Figure 7:
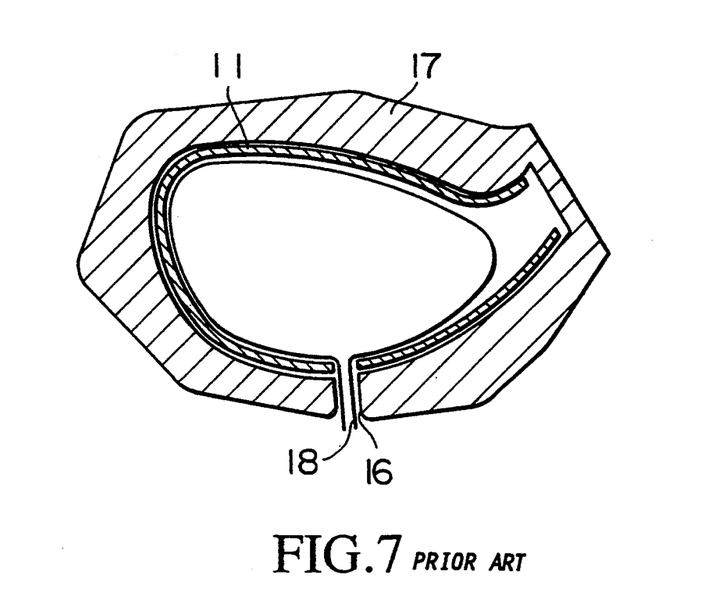
FIG. 7 is an example of a conventional manufacturing method and is an explanatory diagram showing the condition wherein the component materials are inserted into a mold.

As a manufacturing method for a hollow article such as a golf club head or the like, a method has been proposed wherein component materials, of which shapes obtained by partitioning the approximate shape of the head into two or more parts, are formed out of a fiber reinforced thermoplastic resin prepreg, and inserted into a mold as a provisional assembly. This then is heated and molded as the internal pressure is increased. FIGS. 6 and 7 show an example of this manufacturing method for a golf club head (hereinafter referred to simply as "head"). FIG. 6 is a perspective view showing an example of the shapes of the component materials, while FIG. 7 is an explanatory diagram showing the condition wherein a component material is inserted into a mold. The numerals 11, 12, 13, and 14 in the figures represent, respectively, the component material, the face surface of the head, the sole, and the crown.

In the manufacture of such a hollow article as this head, a prepreg in the form of a sheet of a desired thickness is first prepared. By deep drawing, the prepreg is shaped into each of the component materials 11 which form each of a face surface 12, a sole 13, and a crown 14 as are shown in FIG. 6. Further, at an optional position on the component material 11, a through opening 15 is provided for adding pressure to the internal portion of the head.

Next, the obtained component materials 11 are placed within the mold as a provisional assembly as is shown in FIG. 7. The inner surface of the mold is a hollow body having the shape of the head. A through opening 16 is provided at an optional position of the mold and is constructed so that pressure may be added to the internal portion of the head by introducing a medium for adding pressure within the head from the through opening 16. Further, this mold 17 is entirely housed within a vacuum heating device which is not shown in the figures.

Moreover, to the inner side of the provisional assembly of the component materials 11 there is inserted a balloon 18 consisting of silicone resin or the like. The mouth of this balloon 18 is connected to a pressure device, not shown in the figures, via the through opening 15 of the component material 11 and the through opening 16 of the mold 17.

In this condition, the vacuum heating device in which mold 17 is housed is evacuated of air so that the pressure in the space formed between the component materials 11 and the mold 17 is reduced. Further, the pressure within the balloon 18 is increased by introduction of a medium for adding pressure such as nitrogen gas or the like, while at the same time heating is carried out.

As a result of this heating, the component materials 11 are again melted while at the same time, because of evacuation and addition of pressure, there is an application of force directed from the inside to the outside of the component materials 11. Accordingly, the radial dimensions increase and component materials 11 are molded to a shape corresponding to the shape of the inner surface of the mold 17.

Further, following cooling of the mold 17, the pressure state is lifted, the balloon 18 is extracted, and the mold 17 is removed. Consequently, a head-shaped hollow body is obtained.

Figure 8A:
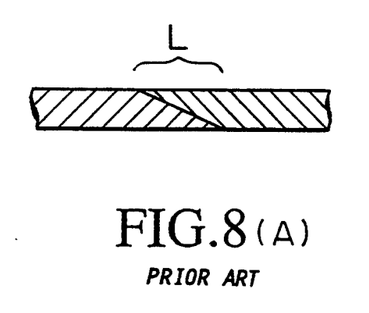
FIGS. 8A-8C show examples of conventional manufacturing methods and show cross sectional diagrams showing examples of the junctions of the component materials.
Figure 8B:
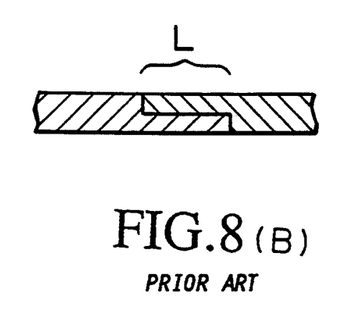
Figure 8C:
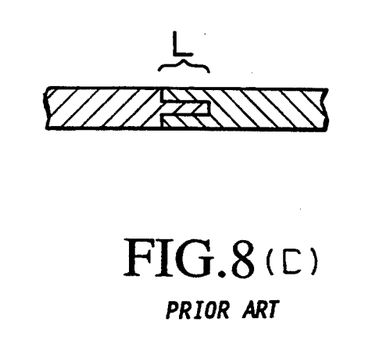

When forming a hollow molded article by this method, an overlapping portion (denoted by the symbol L in the figure) may be provided by forming a tapered portion, a step portion, or a grooved portion on the end surface of the junction of each component material 11 as is shown in FIG. 8 so that a certain degree of strength can be obtained in the junctions.

However, although a certain degree of strength can be obtained with this type of joining method, when a great deal of force is applied there is a possibility that damage will be incurred at the junctions. Accordingly, a further improvement in strength was desired.

SUMMARY OF THE INVENTION

The present invention was developed in consideration of the above explained circumstances, and has as its object the provision of a method of manufacturing a fiber reinforced thermoplastic resin molded article for which it is possible to improve the strength of the junctions in the case where manufacturing a hollow molded article by joining a plurality of component materials consisting of fiber reinforced thermoplastic resin.

The method according to the present invention for manufacturing a hollow molded article from a fiber reinforced thermoplastic resin, by joining a plurality of component materials consisting of fiber reinforced thermoplastic resin, applies the means of affixing, to junctions of the component materials, reinforcing members consisting of a prepreg wherein reinforcing fiber is impregnated with thermoplastic resin, housing this within a mold as a hollow provision assembly, and forming a joined unitary body by adding pressure and heating, in order to solve the aforementioned problems.

Accordingly, by means of the method for manufacturing a fiber reinforced thermoplastic resin molded article according to the present invention, it is possible to efficiently mold even a complicatedly shaped hollow article without damaging the strength of the fiber reinforced thermoplastic resin raw material. Further, it is possible to obtain an excellent molded article which excels in mechanical strength even along the junctions of the component materials, and at the same time which is free of irregularities due to the reinforcing members and which has a continuous and smooth molded surface.

BRIEF DESCRIPTION OF THE DRAWINGS

FIGS. 2A and 2B illustrate the manufacturing method of the present invention.

DETAILED DESCRIPTION OF THE EMBODIMENTS

Figure 1:
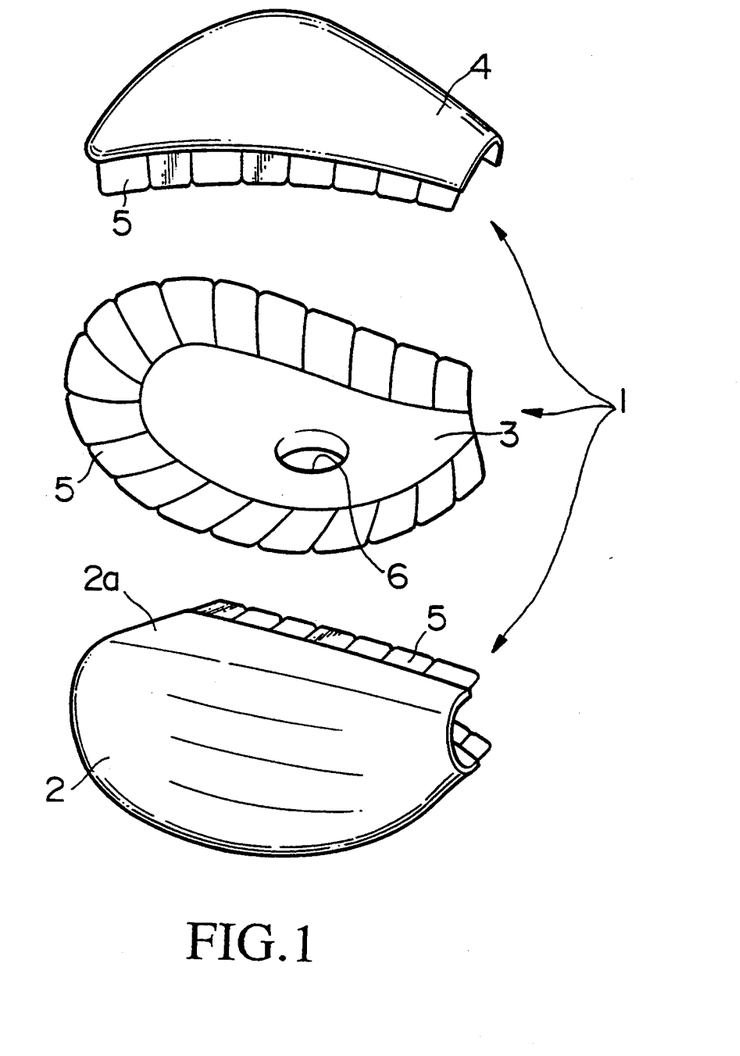
FIG. 1 is an example of the manufacturing method of the present invention and is a perspective view showing an example of the shapes of the component materials.
Figure 2A:
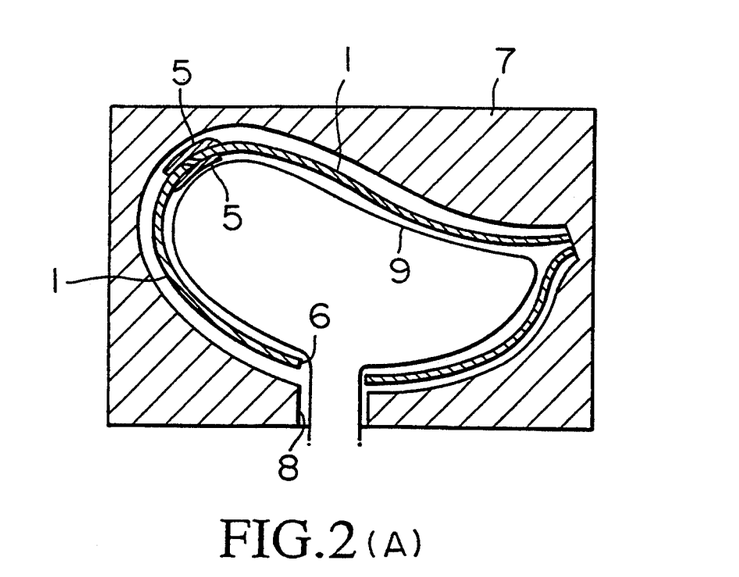
FIG. 2A is an explanatory diagram showing the condition wherein component materials are inserted into a mold.
Figure 2B:
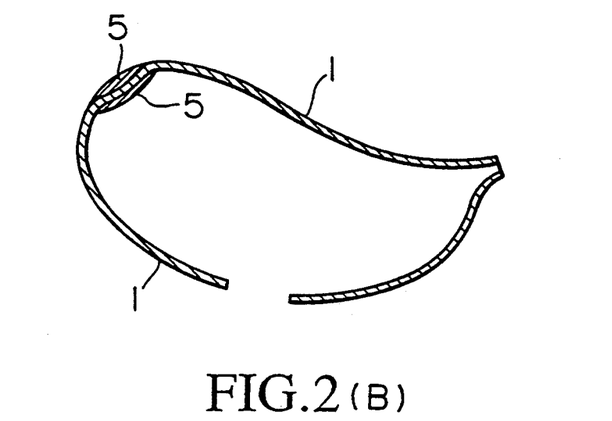
FIG. 2B is an explanatory diagram showing the molded article.

A detailed explanation of the present invention follows below. As an embodiment of the manufacturing method of the present invention, FIGS. 1 and 2 show an example of the process fox manufacturing a hollow golf club head. The numerals 1, 2, 3, 4, and 5 in the figures indicate, respectively, component material, face surface, sole, crown, and reinforcing member.

The fiber reinforced thermoplastic resin (FRTP) used in the present invention consists of reinforcing fiber and thermoplastic resin. The thermoplastic resin is an engineering plastic such as polyamide, poly(butylene terephthalate), poly(oxymethylene) (i.e., acetal resin), polycarbonate, and modified poly(phenylene sulfide); preferable in particular is a substance for which the heat distortion temperature (according to ASTM-D648 at 18.6 kg/cm$^2$) is 140° C. or less. These may be used singly, or as a blended polymer of two or more types.

Further, carbon fiber, aramide fiber, fiber glass or the like may be used as the reinforcing fiber used in the present invention. These too may be used singly or in a combined application of two or more types. Further, as for the configuration of the reinforcing fiber, a roving wherein a plurality of filaments are aligned in a single direction is generally used, but in addition to this, a roving cloth or the like is also applicable.

Both sheet and tape forms are available for the configuration of the FRTP prepreg consisting of reinforcing fiber and thermoplastic resin, however, in the case where molding is carried out by deep drawing, a sheet form is preferable. The manufacturing of the prepreg may be carried out, for example, using a method wherein a powdered thermoplastic resin is scattered on top of the reinforcing fiber and impregnates the fiber through heating and melting, a method wherein a thermoplastic resin is formed into filaments and these filaments undergo roving with the reinforcing fiber, or a method wherein a thermoplastic resin in the form of a film and a reinforcing fiber in the form of a cloth are alternately laminated in a plurality of layers and are heated and adding pressure. Further, the quantity of the reinforcing fiber in the prepreg is preferably in a volume ratio of 40 to 80%.

First, component material 1 is formed.

A prepreg in the form of a sheet of the desired thickness is prepared. This prepreg may be formed by a method of alternate lamination of a plurality of layers of the thermoplastic resin in the form of a film and the reinforcing fiber in the form of a sheet to a desired thickness, and then heating and adding pressure.

Next, the prepreg is molded into the shape of component material 1 by deep drawing. FIG. 1 shows an example of the shapes of the component materials 1. These were obtained by partitioning the approximate shape of the head into three parts, these having respectively the shape. of the face surface 2, the sole 3 and the crown 4.

The shape of the component material 1 molded here is a shape obtained by partitioning the approximate shape of the hollow head into preferably two or more parts. The shape of the component material 1 is optional provided that the shape is one for which there is no inverse taper formed and which may be molded by deep drawing. However, in order to provide a high degree of strength to correspond to the contact force with a ball, and so that molding may be easily carried out by deep drawing, it is preferable that the shape of the face surface 2, which will be the surface colliding with the ball, be one having a curving portion 2a of a circumference of at least 5 mm or more, or that the face surface 2 and the sole 3 form a continuous shape.

Further, at an optional position of the component material 1, a through opening 6 is provided for applying pressure within the head. The through opening 6 may be provided in, for example, the sole 3. Further, the combined external dimensions of the component materials 1 to be molded are made smaller than the desired external dimensions of the head, preferably by 0.5 mm. It is also preferable to form to the mutual junctions of each component material 1, an overlapping portion by cutting each end surface into a taper.

Reinforcing members 5 are affixed to the junctions of the thus molded component materials 1. These reinforcing members 5 are small pieces consisting of a prepreg wherein reinforcing fiber is impregnated with thermoplastic resin. It is preferable to use a prepreg formed by impregnating a reinforcing fiber cloth with a thermoplastic resin of the same type as that used for the component materials 1.

After forming a provisional assembly of component materials 1, it is preferable that the reinforcing members 5 are affixed to both component materials 1 to be joined so as to bridge and combine them. In order that there is no position disalignment, it is preferable to pre-fix a portion of reinforcing members 5 to the component materials 1. This fixing is preferably carried out by fusion. Further, the reinforcing members 5 may be affixed to one or both surfaces of the component material 1 at the junctions. It is preferable to affix the reinforcing members 5 to both the inner and outer surfaces of the component material 1 at the junctions in order to provide a high degree of strength. In the case where affixing to one surface, the affixing is preferably done to the side on which tensile force will act, when an article is manufactured by joining the component materials 1, due to the bending forces on the junctions.

An optional method may be used as the method for affixing reinforcing members 5. However, as is shown in FIG. 1, a portion of the reinforcing members 5 may be fixed by fusing to the peripheral edge of the outer or inner surface by which one component material 1 is to be attached to another component material 1, in a manner such that the reinforcing member 5 extends outward from the peripheral edge of the component material 1. When fixing the reinforcement members 5 by fusing with the peripheral edge of the component material 1, by aligning the reinforcing members 5, formed as small pieces, and by attaching neighboring reinforcement members 5 to each other, it is possible to arrange reinforcing members 5 along this curving portion of the component material 1.

Further, in the case where affixing the reinforcing members 5 to both surfaces of the junction, reinforcing members 5 are fixed to the outer surface of one of the component materials 1 to be joined, while reinforcing members 5 are fixed to the inner surface of the other component material 1 to be joined. As a result, when the component materials 1 are joined, it is possible to provide reinforcing members affixed to both the inner and outer surfaces of the junctions.

In this fashion, the component materials 1 to which an end of each of the reinforcing members 5 is fixed, is attached within a mold 7 as shown in FIG. 2A as a provisional assembly so that the junction surfaces of each of the component materials 1 contact each other.

The inner surface of the mold 7 is a hollow body having the shape of the head. A through opening 8 is provided through an optional position of the mold 7, so as to reach the inner wall which will form the head portion, and so that the pressure within the head may be increased by introducing a medium for adding pressure to the inside of the head from this through opening 8. This through opening 8 may, for example, be provided passing through the mold 7 at a position at which the sole will be formed. Further, the mold 7 is entirely housed within a vacuum heating device (not shown in the figures).

When the component materials 1 are housed within the mold 7 in this manner, the junction surfaces of both component materials 1 come into contact at the junctions, while at the same time the reinforcing members 5 become affixed to either both or one of the inner and outer surfaces.

A balloon 9 consisting of a silicone resin is inserted in the inner side of the provisional assembly of the component materials 1. The mouth of this balloon 9 is connected to the pressure device, not shown in the figures, via the through openings 6 and 8 of the component material 1 and the mold 7 respectively. A thickness of 0.05 to 2 mm, and preferably 0.2 to 1 mm, is applicable for the thickness of the balloon 9.

In this condition, the pressure is reduced in the space between the component materials 1 and the mold 7 by evacuating the inside of the vacuum heating device. Further, pressure is increased within the balloon 9 by introduction of a medium for adding pressure, while at the same time heating is performed. While any gaseous body such as air, nitrogen gas, or the like is permissible as the medium for adding pressure used at this time, a liquid such as oil may be used as well.

Due to this heating, the component materials 1 and the reinforcing members 5 are melted again. At the same time, due to the evacuation and addition of pressure, there is an application of force from the inside to the the outside of the assembly of the component materials 1. The radial dimensions increase and component materials 1 and reinforcing members 5 are molded to a shape corresponding to the shape of the inner surface of the mold. At this time, the reinforcing fiber within component materials 1 and reinforcing members 5 is simultaneously acted on by the radial outward force and in the same manner begins to expand, becoming taut with an absence of slack. If this pressure state is maintained and the mold is cooled, then the reinforcing fiber hardens in this taut state in the thermoplastic resin of the matrix.

The conditions for adding pressure and heating here are a temperature of 250° to 280° C., a pressure of 8 to 15 kg/cm$^2$ and a time period of 10 to 30 minutes. However, the conditions for adding pressure and heating are in no way intended to be limited to these ranges, but may be appropriately set in response to the type of thermoplastic resin to be used, the dimensions of the head, the quantity of the reinforcing fiber, or the like. Further, the pressure of the space between the component material 1 and the mold 7 may be reduced by 0.01 to 1 mmHg. Following pressure reduction, a preliminary pressure of 1 to 3 kg/cm$^2$ may be added and the temperature may be increased to 250° C. After this, pressure molding may be performed by increasing the internal pressure.

Following cooling of the mold to 50° to 80° C., the pressure state is lifted and the balloon is extracted. When the mold is removed, a hollow molded body formed in the shape of the head as shown in FIG. 2B is obtained. In this molded article, reinforcing members 5 are affixed to the junctions, and the surface thereof is smooth, without any irregularities arising due to the reinforcing members.

Figure 3:
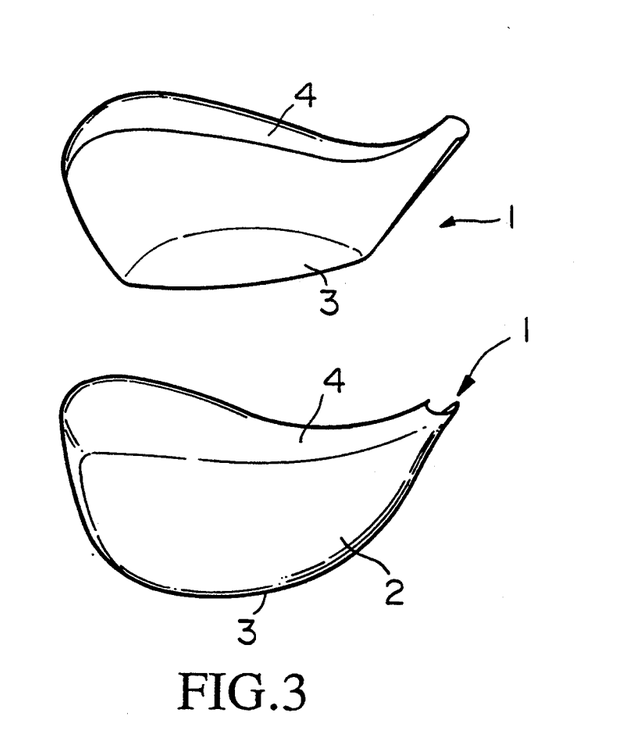
FIG. 3 is a perspective view showing an example of the shapes of the component materials for the manufacturing method of the present invention.

In the above embodiments, the shapes of component materials 1 shown were obtained by partitioning the approximate shape of the head into three parts as shown in FIG. 1. However, the shapes of component materials 1 are not limited to this, but may be partitioned at convenient positions into a plurality of pieces. FIG. 3 shows another example of the shapes of component materials 1.

The items shown in FIG. 3 were obtained by partitioning the approximate shape of the head into two parts, one having the shape of the face surface 2, a portion of the sole 3, and a portion of the crown 4, and the other having the shape of a portion of the sole and a portion of the crown.

Figure 4:
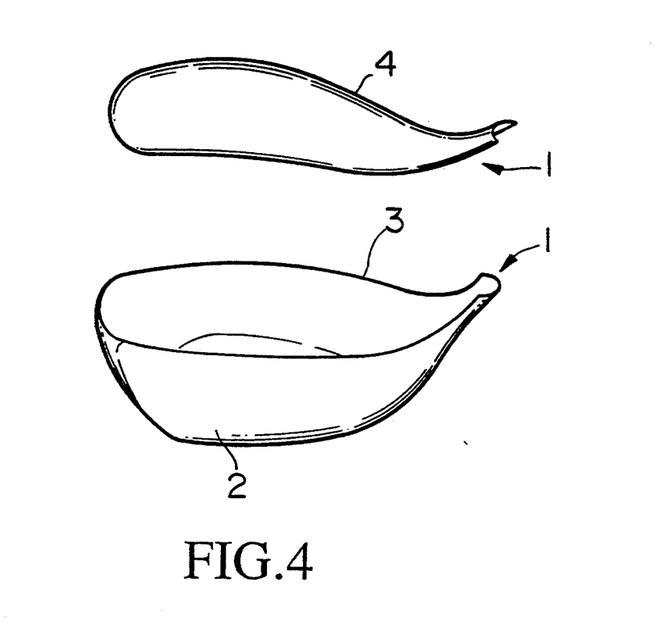
FIG. 4 is a perspective view showing an example of the shapes of the component materials for the manufacturing method of the present invention.

The items shown in FIG. 4 were obtained by partitioning the approximate shape of the head into two parts, one having the shape of the face surface 2 and the sole 3, and the other having the shape of the crown.

EXAMPLE 1

A prepreg in the form of a sheet was first prepared. Seven sheets of polycarbonate film and seven sheets of carbon fiber cloth (CF cloth 8HS, 396 g/m$^2$) were alternately laminated and heated at 200° C. With this temperature being maintained, pressure was intermittently increased, and homogeneous resin impregnation and removal of bubbles was carried out. This operation of adding pressure was carried out eight times at a pressure of 30 kg/cm$^2$ over a 16 minute period of time. Following this, further heating to 250° C. was performed and maintaining this temperature, addition of pressure at 15 kg/cm$^2$ was carried out continuously over a 20 minute period of time, to form the prepreg.

Using the obtained prepreg, the component materials having the shapes as shown in FIG. 1 were molded by deep drawing. In this example, the shape of the component material having the face surface was one having a 5 mm curving portion at the circumference thereof, and the component material having the sole was provided with a through opening. Further, the external dimensions of the component materials were made in such a manner that the combined external dimensions thereof would be smaller than the inner dimensions of the mold to be used at the final molding, with that difference being 0.5 mm.

The prepregs were disposed in metallic molds having the shapes of the aforementioned component materials. Following softening of the prepregs by maintaining at 180° C. for 6 minutes, pressing was carried out for 2 minutes while maintaining the temperature. The unneeded end portion of the obtained molded article was cut off, obtaining the necessary shape. Further, the junction surfaces of each component material was tapered and an overlapping portion having a width of 5 mm was formed.

The reinforcing members were prepared. A prepreg sheet was formed by impregnating satin-woven carbon fiber cloth with polycarbonate (thickness: 0.5 mm, fiber content: 50% by volume). This was cut into small pieces, forming the reinforcing members. These reinforcing members were of a rectangular shape having a length of approximately 40 mm and a width of approximately 20 mm.

These reinforcing members were fused along their lengths to the peripheral edges of the component materials. The reinforcing members were disposed along both the inner and outer surfaces of respective junctions.

The thus obtained component materials were placed within a mold as a provisional assembly. Further, a silicone balloon having a thickness of 0.5 mm was inserted within the provisional assembly of the component materials. The mouth portion of the silicone balloon was connected to a pressure device via a through hole.

Further, the mold was housed within a vacuum heating device and the pressure was reduced by 700 mmHg therein. Next, preliminary pressure was added by introducing nitrogen gas within the silicone balloon. The internal pressure of the assembly of the component materials was set to 3 kg/cm$^2$ while preliminary heating was carried out. The internal temperature of the vacuum heating device was set to 250° C. Further, the temperature was raised to 270° C. within the vacuum heating device. Nitrogen gas was introduced within the silicone balloon, setting the internal pressure to 10 kg/cm$^2$. After maintaining the system in this state for 20 minutes, the vacuum was released and the mold was removed from the vacuum heating device and cooled. When the temperature of the block mold reached approximately 80° C., addition of pressure was ended, the mold was taken off, the silicone balloon was removed, and a hollow molded body in the shape of the head was obtained.

The thus obtained hollow molded body was one formed of a joined unitary body having a overlapping portion having a width of 5 mm at the junctions along which the component materials were joined, while at the same time, at both the inner and outer surfaces thereof reinforcing members were fused in a belt-like shape having a width of 25 mm along these junctions.

EXAMPLE 2

A hollow molded body in the shape of the head was manufactured in the same manner as in Example 1, with the exception that the reinforcing members were aligned along the outer surface of the junctions, in other words along the side on which tensile force acts during molding, and that the thickness of the reinforcing members was 1.0 mm.

EXAMPLE 3

A hollow molded body in the shape of the head was manufactured in the same manner as in Example 1, with the exception that the reinforcing members were aligned along the outer surface of the junctions, in other words along the side on which tensile force acts during molding.

COMPARATIVE EXAMPLE 1

A hollow molded body in the shape of the head was manufactured in the same manner as in Example 1, with the exception that the reinforcing members were aligned along the inner surface of the junctions, in other words along the side on which compressive force acts during molding, and the thickness of the reinforcing members was 1.0 mm.

COMPARATIVE EXAMPLE 2

A hollow molded body in the shape of the head was manufactured in the same manner as in Example 1, with the exception that the reinforcing members were aligned along the inner surface of the junctions, in other words along the side on which compressive force acts during molding.

COMPARATIVE EXAMPLE 3

A hollow molded body in the shape of the head was manufactured in the same manner as in Example 1, with the exception that the reinforcing members were not aligned along either the inner or outer surfaces of the junctions, and the width of the overlapping portion in the junctions was 10 mm.

COMPARATIVE EXAMPLE 4

A hollow molded body in the shape of the head was manufactured in the same manner as in Example 1 with the exception that the reinforcing members were not aligned along either the inner or outer surfaces of the junctions.

TEST

The fracture load by bending in the junctions was checked for the hollow molded bodies obtained in Examples 1 through 3 and Comparative Examples 1 through 4 and, based on this, the junction strengths of each Example and Comparative Example were evaluated. The fracture load by bending was tested 10 times and the maximum, minimum and average values of these results were checked.

Additionally, as a reference example, a similar fiber reinforced thermoplastic resin molded article without junctions was checked for the fracture load by bending in the same fashion.

These results are shown in Table 1.

Figure 5:
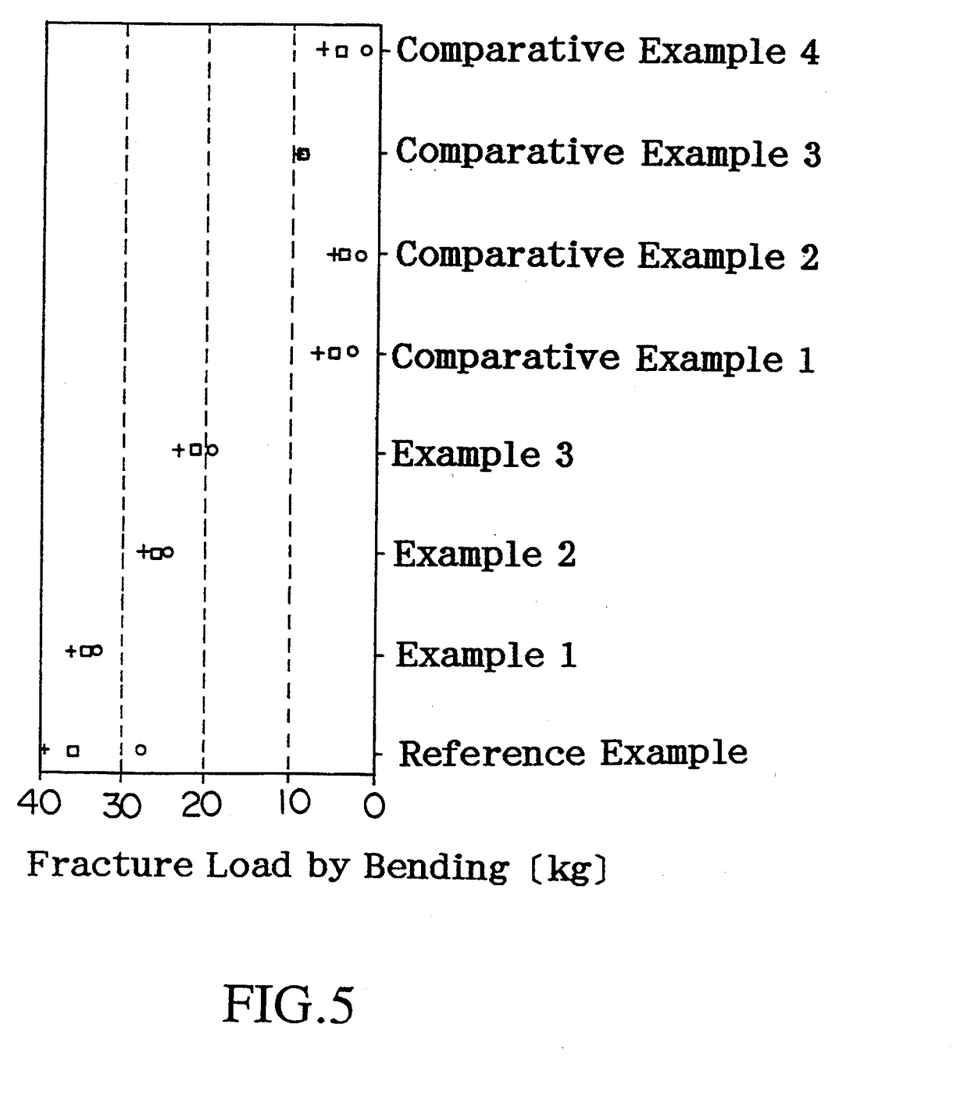
FIG. 5 is a diagram showing experimental results.

The results shown in Table 1 are also shown in graph form in FIG. 5. This figure shows the test results for Examples 1 through 3, Comparative Examples 1 through 4, and the reference example, with the fracture load by bending being shown on the vertical axis. The symbols +, ○, and □ indicate respectively maximum value, minimum value and average value.

TABLE 1

| | Overlapping Width (mm) | Thickness of Reinforcing members (mm) | Reinforced Surface | Fracture Load by Bending (kg) | | |
|---|---|---|---|---|---|---|
| | | | | Average | Maximum | Minimum |
| Example 1 | 5 | 0.5 | both | 34.38 | 36.39 | 33.53 |
| Example 2 | 5 | 1.0 | outer | 26.02 | 27.55 | 25.12 |
| Example 3 | 5 | 0.5 | outer | 21.46 | 23.69 | 19.30 |
| Comparative Example 1 | 5 | 1.0 | inner | 4.97 | 7.06 | 3.02 |
| Comparative Example 2 | 5 | 0.5 | inner | 4.11 | 5.31 | 2.27 |
| Comparative Example 3 | 10 | none | | 9.32 | 9.66 | 9.00 |
| Comparative Example 4 | 5 | none | | 4.79 | 6.97 | 1.82 |
| Reference Example | 5 | none | | 36.08 | 39.59 | 27.83 |

From these results, it was determined that for the case where reinforcing members are aligned along both surfaces of the junction as in Example 1, there is an improvement in the junction strength over the case where joining is accomplished by only providing an overlapping portion to the junctions as in Comparative Examples 3 and 4. Moreover, in the case where reinforcing members are aligned along both surfaces of the junction as in Example 1, a degree of strength comparable to the case where molding is performed without a junction, as in the reference example, may be obtained.

Further, from the results of Examples 2 and 3 and Comparative Examples 1 and 2, it was determined that in the case where aligning reinforcing members along only one surface of the junctions, by aligning the reinforcing members along the side on which tensile force acts (outer surface) and not along the side on which compressive force from bending acts (inner surface), it is possible to improve junction strength.

What is claimed is:

1. A method of manufacturing a hollow molded article by joining a plurality of separate component materials consisting of fiber reinforced thermoplastic resin, said method comprising the steps of:

affixing a reinforcing member consisting of a prepreg wherein reinforcing fiber is impregnated with thermoplastic resin, to the junction along which said component materials are joined;

housing said component materials within a mold as a hollow provisional assembly; and forming a joined unitary body by heating while increasing the internal pressure within said hollow provisional assembly.

2. A method of manufacturing a hollow molded article as set forth in claim 1, wherein said component materials are housed within the mold such that they overlap along the junction at which they are joined.

3. A method of manufacturing a hollow molded article by joining a plurality of separate component materials made of fiber reinforced thermoplastic resin, said method comprising the steps of:

affixing a plurality of reinforcing members made of a prepreg wherein reinforcing fiber is impregnated with thermoplastic resin to the junction along which said component materials are joined;

housing said component materials within a mold as a hollow provisional assembly; and forming a joined unitary body by heating while increasing the internal pressure within said hollow provisional assembly.

4. A method of manufacturing a hollow molded article as set forth in claim 3, wherein the components are overlapped along the junction at which they are joined.

5. A method of manufacturing a hollow molded article as set forth in claim 3 in which during heating tensile forces act on one of the surfaces at the junction and the reinforcing members are affixed to the surface at which the tensile forces act.

6. A method of manufacturing a hollow molded article as set forth in claim 3, in which during heating compressive forces act on one of the surfaces at the junction and the reinforcing members are affixed to the surface at which the compressive forces act.

7. A method of manufacturing a hollow molded article as set forth in claim 4, wherein the component materials have inner and outer surfaces and the reinforcing members are attached to one of the inner and outer surfaces.

8. A method of manufacturing a hollow molded article as set forth in claim 7, wherein reinforcing members are affixed to the outer surface of one of the component materials to be joined at the junction and reinforcing members are affixed to the inner surface of another one of the component materials to be joined at said junction.

* * * * *